United States Patent
Nagano

[11] Patent Number: 6,012,708
[45] Date of Patent: Jan. 11, 2000

[54] COOLING TOWER

[75] Inventor: Shigeru Nagano, 149 4-chome, Nakanishi-go, Gifu-shi, Gifu-ken, Japan

[73] Assignee: Shigeru Nagano, Japan

[21] Appl. No.: 08/962,761

[22] Filed: Nov. 3, 1997

[30] Foreign Application Priority Data

Nov. 6, 1996 [JP] Japan ................................. 8-311375
Jun. 30, 1997 [JP] Japan ................................. 9-190447

[51] Int. Cl.$^7$ ..................................................... B01F 3/04
[52] U.S. Cl. ................. 261/109; 261/111; 261/DIG. 11; 261/DIG. 27; 261/DIG. 46
[58] Field of Search .................... 261/109–111, DIG. 11, 261/DIG. 46, DIG. 27

[56] References Cited

U.S. PATENT DOCUMENTS

| | | | |
|---|---|---|---|
| 1,673,732 | 6/1928 | Brooks | 261/DIG. 27 |
| 2,859,766 | 11/1958 | Shuldener | 261/DIG. 46 |
| 3,450,265 | 6/1969 | Krevsch et al. | 261/DIG. 46 |
| 3,933,196 | 1/1976 | Heller et al. | 261/109 X |
| 4,007,241 | 2/1977 | Phelps | 261/DIG. 11 |
| 4,045,193 | 8/1977 | Halliday | 261/DIG. 11 |
| 4,054,623 | 10/1977 | Ouska | 261/DIG. 11 |
| 5,145,585 | 9/1992 | Coke | 261/DIG. 11 |
| 5,273,687 | 12/1993 | Osborne | 261/DIG. 46 |
| 5,294,916 | 3/1994 | Bolton et al. | 261/DIG. 11 |
| 5,403,521 | 4/1995 | Takahashi | 261/DIG. 46 |

Primary Examiner—Richard L. Chiesa
Attorney, Agent, or Firm—Liniak, Berenato, Longacre & White

[57] ABSTRACT

A cooling tower includes a cover and a heat exchanger positioned within a water circulation channel in order to exchange heat between water and air through contact with air. A closed housing is positioned within the cover, and the heat exchanger is positioned within and maintained in an airtight state within the housing. An air supply duct is in communication with the housing for supplying air, and an exhaust duct is in flow communication for exhausting air from the housing. A blower generates air flow in the air supply duct, the housing, and the exhaust.

13 Claims, 3 Drawing Sheets

COOLING TOWER

BACKGROUND OF THE INVENTION

1. Field of the Invention

The present invention relates to a cooling tower for performing cooling by using a heat exchanger set to the middle of a water circulation channel, and thereby contacting water with air and releasing the heat of the water.

2. Description of the Prior Art

It is generally known that a refrigerator has been used so far in the fields of chemical processes and air conditioners in order to cool or refrigerate a substance. Moreover, to recycle the water in a condenser of a refrigerator, a cooling tower is normally used. The condenser cools a high-pressure high-temperature refrigerant gas discharged from a compressor of the refrigerator with water to condense (to liquefy) the gas. The cooling water cools the water whose temperature is raised by the condenser by releasing the heat of the water into the atmosphere. The water normally uses industrial water, well water, and city water containing hard components such as calcium, magnesium, and silica ions.

In the case of this cooling tower, as shown in FIG. 4, air 52 outside of a housing 51 is introduced into the housing 51 from an air supply port 54 by the operation of a fan 53. The air 52 passes through a filler 55 and thereafter, it is discharged from an aperture 56 at the top end of the housing 51. Water 57 whose temperature is raised by a condenser 65 of a refrigerator 64 passes through a pipe 66 and a water intake pipe 58 and then, it is sent to a water spray pipe 59 and dripped from the pipe 59. The dripped water 57 slowly flows downward through the filler 55. In this case, the above-described air 52 contacts the water 57 and the heat of the water 57 is released into the air 52. Thus, the temperature of the water 57 is lowered up to 20 to 40° C. due to the release of the heat. The water 57 thus cooled is temporarily stored in a water tank 61 and then, discharged to the outside of the housing after passing through a drain pipe 62. Thereafter, the water 57 is returned to the condenser 65 after passing through the pipe 66.

In the cooling tower 63, the amount of the water 57 flowing through the circulation channel slowly decreases because some of the water 57 in the housing 51 becomes water vapor and goes out of the top-end aperture 56 or the like. Because of the decrease of the amount of the water 57, the concentration of the hard components in the water 57 increases and therefore, the components precipitate and attach to the condenser 65 and the pipe 66 as scales. The scales cause the heat exchange efficiency of the condenser 65 to lower. Moreover, when the water 57 having the high-concentration hard components contacts the condenser 65 and pipe 66, a local potential difference is produced on their contact faces (metallic surfaces). Thereby, a metal fuses at an anode portion and the so-called corrosion occurs. Therefore, it is preferable to prevent the metal from fusing at the anode portion by forming a protective film on metallic surfaces.

Therefore, the so-called blow-down is conventionally performed which forcibly discharges the water 57 to the outside of a circulation channel by opening a drain valve 67 and moreover, the water 57 is renewed by supplying make-up water to the circulation channel to lower the concentration of hard components in the water 57. Moreover, chemicals such as orthophosphate, polymeric orthophosphate, and phosphonate are added to the water 57 so as to form a protective film on the metallic surfaces of the condenser 65 and the pipe 66.

[Problems to Be Solved by the Invention]

In the case of the above conventional cooling tower 63, however, the inside of the housing 51 is released into the atmosphere at the air supply port 54 and the top-end aperture 56. Thus, the sunlight irradiates the inside of the housing 51 through these released portions. Because the cooling tower 63 has a structure of introducing outside air into the housing 51 only by the attraction due to the rotation of the fan 53, it is impossible to close the air supply port 54. Moreover, the cooled water 57 has a temperature (20 to 40° C.) suitable for growth of algae. This temperature is also suitable for breeding of bacteria including *Legionella pnuomophila*. Therefore, when the cooling tower 63 is used for many years, algae may grow or bacteria may breed at the inside and outside of the housing 51. In this case, it is necessary to remove algae and the like with chemicals. However, a new problem occurs that the circulation channel is clogged with removed algae and the like. This problem cannot be solved as long as algae and the like grow. Thus, the conventional cooling tower 63 is not preferable from the viewpoint of health and moreover, there is a problem that the cooling tower 63 is not suitable for indoor installation.

Furthermore, in the case of the conventional cooling tower 63, it is necessary to decrease the concentration of hard components in the water 57 or add a lot of chemicals to the water 57 as described above and therefore, these operations are troublesome. For this reason, it is considered to soften the hard components by setting a generally-known water softener to the channel of make-up water in the field of boiler systems. However, in the case of the conventional cooling tower 63 in which the air 52 is directly introduced into the housing 51 through the air supply port 54 because it is set to an outdoor well-ventilated place, dust and foreign matter enter the housing 51 together with the air 52 through the air intake port 54 and may be contained in the water 57. Therefore, even when the hard components are softened by the water softener, hard components and impurities are still contained in water and therefore, it is difficult to obtain a satisfactory result.

SUMMARY OF THE INVENTION

Objects

Therefore, it is a main object of the present invention to provide a cooling tower capable of preventing algae from growing and fungi from breeding, keeping the inside of a housing clean, and allowing indoor installation. Moreover, it is another object of the present invention to provide a cooling tower capable of controlling attachment of scales to the condenser and pipes of a refrigerator while keeping the amount of water flowing through a circulation channel almost constant and preventing the heat exchange efficiency from lowering due to the attached scales.

Means for Solving the Problems

The invention comprises a heat exchanger positioned the middle of a water circulation channel to perform heat exchange between water and air through contact with the air, a housing for housing the heat exchanger under an airtight state, an air supply duct and an exhaust duct connected to the housing, and blowing means for generating an air flow in the air supply duct, housing, and exhaust dust.

According to the invention, water passes through the heat exchanger in the housing while flowing through the circulation channel. Moreover, the air flow generated by the blowing means pass through the air supply duct, housing, and exhaust duct. In the heat exchanger, water and air contact each other and the heat of the water is released into the air. Thereby, the temperature of the water is reduced and the temperature and humidity of the air rise. The housing for cooling water is closed and therefore, the sunlight does not reach the inside of the housing. Therefore, growth of algae, moss, and mold requiring the sunlight are prevented from growing and breeding of fungi is controlled.

In a further aspect of the invention, a housing is almost cylindrical and an air supply duct is diagonally connected to the outer periphery of the housing so as to extend in the almost tangential direction of the outer periphery, in addition to the structure of the invention as previously described.

According to the further aspect of the invention, the air entering the housing from the air supply duct flows spirally along the inner wall of the housing. The staying time of air in the housing, that is, the contact time of air with water increases compared to the case in which air linearly flows inward along the radius direction of the housing.

In yet a further aspect of the invention, an air treatment apparatus having either a dehumidifying function, and a cooling function is positioned in the middle of the air intake duct, in addition to the structure of the invention as previously described.

According to the further aspect of the invention, air passes through an air treatment apparatus while flowing through an air supply duct. When the apparatus has the dehumidifying function, the moisture of the air is removed by the apparatus while passing through the apparatus and dry air having an almost constant temperature enters the housing. A lot of the heat of water is released due to contact between the dry air and the water.

Moreover, when the air treatment apparatus has the cooling function, air is cooled while passing through the apparatus. The water vapor of the air is saturated while the air is cooled. When the air is further cooled, the water vapor starts condensing. Thus, the moisture is separated from the air and thereby, the humidity of the air lowers. The air whose temperature and humidity are lowered enters the housing and contacts with the high-temperature water in the housing. When the air contacts with the water, the temperature of the air rises. In the case of humidity, the width until the water vapor is saturated increases and thereby, a lot of moisture is introduced into the air. That is, more latent heat of vaporization is taken from the water.

In another aspect of the invention, a first sterilizer is positioned in the middle of the exhaust duct, in addition to the structure previously described.

According to the another aspect of the invention, even if fungi, such as bacteria, breed in the housing having a high temperature and a high humidity and enter the exhaust duct together with air, the fungi are sterilized by the first sterilizer set to the middle of the exhaust duct. Clean air, free from fungi, is exhausted into the atmosphere through the exhaust duct.

In the case of a further feature of the invention, a water tank for storing the water after being heat-exchanged by the heat exchanger positioned at the bottom of the housing and moreover, a second sterilizer is set in the water tank.

According to the further feature of the invention, the water after being heat-exchanged by the heat exchanger is stored in the water tank at the bottom of the housing. Even if fungi such as bacteria are contained in the water stored in the water tank, the fungi are sterilized by the second sterilizer.

In another feature of the invention, a position at the downstream side of the air treatment apparatus of the air intake duct is communicated with the exhaust duct by a bypass pipe, in addition to the other structure of the invention.

According to the another feature of the invention, some of the (dry) air whose humidity lowers after passing through an air treatment apparatus enters a bypass pipe. The air passes through the bypass pipe and thereafter enters an exhaust duct without passing through a housing. The air entering the exhaust duct mixes with the air entering the exhaust duct through the housing. As a result, the air whose humidity is lowered is exhausted through the exhaust duct. Therefore, even if the exhausted air mixes with outside air, the amount of the moisture contained in the exhaust air and condensed due to mixture with outside is small and white fumes are not easily produced.

In yet another feature of the invention, a make-up water channel for introducing make-up water into the housing and a water softener are positioned in the middle of the make-up water channel, in addition to the previously structure described.

According to this feature of the invention, some of the water circulating through the circulation channel is evaporated in the housing and discharged to the outside of the exhaust duct together with air. Thereby, the amount of water in the circulation channel decreases. The decreased amount of water is replenished by the make-up water introduced into the housing through the make-up water channel. In this case, when the make-up water uses industrial water, well water, and city water, it frequently contains hard components such as calcium and magnesium ions. However, these hard components are softened by the water softener positioned in the middle of the make-up water channel. Therefore, make-up water free from hard components or containing only a small amount of hard components is introduced into the housing.

In yet a further feature of the invention, a molybdenum-based anticorrosive is added to the water flowing through the circulation channel, in addition to the previously described structure.

According to this feature of the invention, the molybdenum-based anticorrosive added to the water is made of a metallic material and moreover, it reacts on portions contacting with water such as the pipe of the water circulation channel and the metallic surface of the condenser of the refrigerator to form a protective film made of the oxide of molybdenum and metal on these surfaces. The protective film is stronger and more dense than a protective film made of orthophosphate, polymeric orthophosphate, and phosphonate and shows a corrosion resistance higher than that of the latter protective film. Therefore, even if ions such as silica ions, chlorine ions, and sulphate ions which cannot be removed by the water softener remain in the water as harmful components, the reaction between these ions and metallic surfaces is interrupted by the former protective film.

DETAILED DESCRIPTION OF THE PREFERRED EMBODIMENTS

First embodiment

Figure 1:
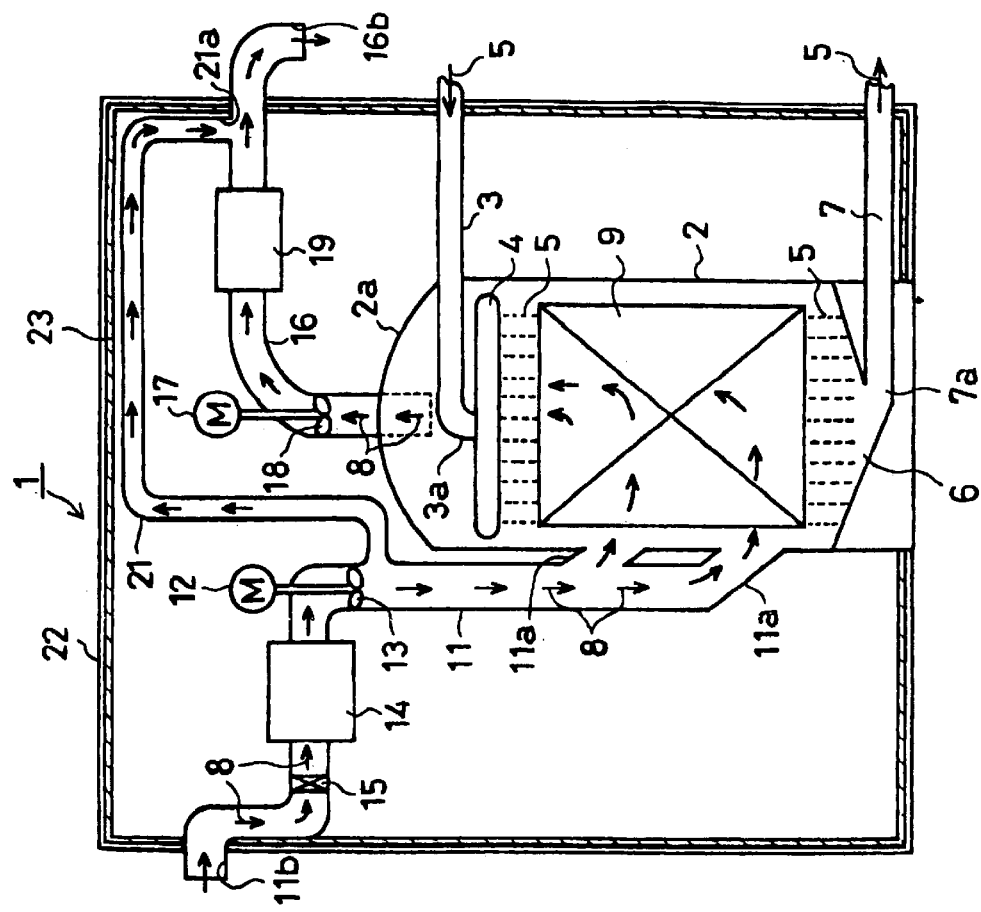
FIG. 1 is a schematic block diagram showing the cooling tower of the first embodiment of the present invention.
Figure 2:
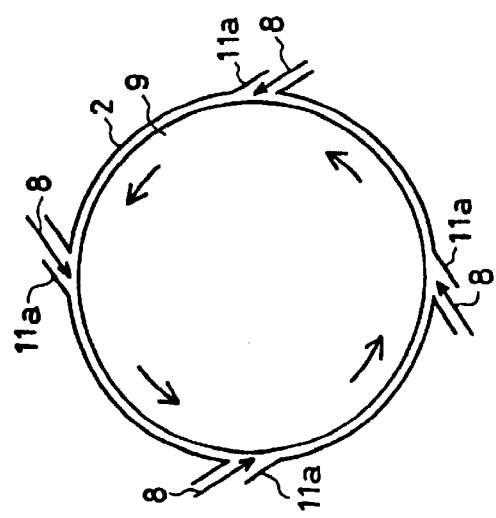
FIG. 2 is an illustration of air flows in the housing in FIG. 1, viewed from the upper side.

The first embodiment is described below by referring to FIGS. 1 and 2.

A refrigerator used for a chemical process or air conditioner is provided with a compressor and a condenser. The condenser cools a high-temperature high-pressure refrigerant gas discharged from the compressor with water. The water uses industrial water, well water, and city water and it is recycled by circulating it through a circulation channel. The water contains hard components such as calcium, magnesium, and silica ions. To recycle the water by circulating it, it is necessary to cool the water whose temperature is raised due to heat exchange with the refrigerant gas by the condenser. Therefore, a cooling tower 1 shown in FIG. 1 is used.

The cooling tower 1 is provided with a housing 2 comprising a closed vessel. Further, the housing 2 is almost cylindrical and its top and bottom ends are closed. A water supply pipe 3 penetrates the top end 2a of the housing 2. The water supply pipe 3 is used to introduce water 5 whose temperature is raised as the result of passing through the condenser into the housing 2. A water spray pipe 4 is connected to the inner end 3a of the water supply pipe 3 so that the water 5 drips from a lot of holes (not illustrated) formed in the water spray pipe 4. A water tank 6 is positioned in the bottom of the housing 2 and the water 5 dripped from the water spray pipe 4 is temporarily stored in the water tank 6. A drain pipe 7 penetrates the bottom of the housing 2, the inner end 7a of the drain pipe 7 is connected to the water tank 6, and the outer end of the pipe 7 is connected to the condenser. The drain pipe 7 introduces the water 5 stored in the water tank 6 into the condenser. Moreover, the above-described water supply pipe 3, water spray pipe 4, and drain pipe 7 constitute a part of the circulation channel of the water 5. In the housing 2, a filler 9 serving as a heat exchanger is set between the water spray pipe 4 and the water tank 6. The filler 9 releases the heat of the water 5 into air 8 through the contact between the water 5 sent from the water spray pipe 4 and the air 8. In this case, the filler 9 is formed like a honeycomb in order to increase the contact area between the water 5 and the air 8.

The housing 2 connects with an air supply duct 11 for introducing the air 8 into the housing 2. Further, the downstream portion of the air supply duct 11 is branched into a plurality of portions and the branched portions 11a are connected to the outer periphery of the housing 2 at almost equal angle from the outer periphery. As shown in FIG. 2, each branched portion 11a is diagonally connected to the outer periphery of the housing 2 so as to extend in the almost tangential direction of the outer periphery. As shown in FIG. 1, a first fan 13 driven by an electric motor 12 is positioned in the middle of the air supply duct 11. A dehumidifier 14 serving as an air treatment apparatus is positioned in the upstream side of the first fan 13 in the air supply duct 11 and moreover, a filter 15 is removably positioned in the upstream side of the dehumidifier 14.

The dehumidifier 14 is an apparatus for removing hygroscopic moisture (moisture) from the air 8, which is also referred to as a humidity reduction apparatus. The dehumidifier 14 can use a cooling dehumidifier, compressive dehumidifier, absorption-type dehumidifier, or adsorption-type dehumidifier. The cooling dehumidifier cools air up to the dew-point temperature or lower. In this case, the dew-point temperature represents the temperature at which the water vapor in air is precipitated due to cooling and starts dew formation. Due to the above cooling, the moisture in the air is precipitated on the surface of a cooler to form water drops which are stored in a precipitated-water vessel. The air whose absolute humidity is lowered due to separation of moisture is heated and returned to the temperature before being cooled. Moreover, the compressive dehumidifier compresses, cools, and expands air. After the air is expanded, air having a dew-point temperature of 0° C. or lower is obtained. Thus, extra moisture in the air is precipitated due to dehumidification. The absorption-type dehumidifier is also referred to as a liquid absorbing dehumidifier which removes moisture from air (dehumidifies air) by a liquid absorbent (dehumidifying agent) such as triethylene glycol. The adsorption-type dehumidifier is also referred to as a solid adsorbing dehumidifier which performs dehumidification by adsorbing moisture from air by a solid adsorbent such as silica gel.

An exhaust duct 16 for leading the air 8 whose temperature is raised due to the above heat exchange to the outside of the housing 2 is connected to the top central portion at the housing 2. A second fan 18 driven by an electric motor 17 is positioned in the middle of the exhaust duct 16. A first sterilizer 19 is set to the downstream side of the second fan 18 in the exhaust duct 16. The first sterilizer 19 can use any type sterilizer for performing sterilization such as by emitting ultraviolet radiation, for example, a type constituted by setting a bactericidal lamp (low-pressure mercury lamp) in a transparent tube. This type has an advantage that sterilization can be effectively performed in a short time without adding any chemical substance to fungi such as bacteria which differs from a method of performing sterilization by heating or chemical treatment.

A bypass pipe 21 is branched from a position at the downstream side of the dehumidifier 14 of the exhaust duct 11. The bypass pipe 21 bypasses the housing 2 and it is connected to the downstream side of the first sterilizer 19 of the exhaust duct 16. Moreover, in the case of this embodiment, the blowing means comprises the above-described pair of fans 13 and 18 and pair of electric motors 12 and 17.

The whole of the housing 2, most of the air supply duct 11, most of the exhaust duct 11, and the whole of the bypass pipe 21 are covered with a cover 22 made of steel plate. Only an air intake port 11b of the air supply duct 11 and an air exhaust port 16b of the exhaust duct 16 are exposed from the cover 22. A sound absorbing material 23 made of sponge and glass wool is pasted to the inner surface of the cover 22.

When the cooling tower 1 constituted as described above operates, the water 5 whose temperature is raised enters the housing 2 through the water supply pipe 3 and it is dripped from a lot of holes of the water spray pipe 4. The dripped water 5 flows downward along the filler 9.

Moreover, the flow of the air 8 (wind) is forcibly generated due to the rotation of the fans 13 and 18 in the air supply duct 11, housing 2, and exhaust duct 16. That is, the air 8 is drawn into the air supply duct 11 through the air intake port 11b. The air 8 passes through a filter 15, the dehumidifier 14, and the first fan 13. When the air 8 passes through the filter 15, dust and dirt contained in the air 8 are captured and only the clean air 8 is introduced into the dehumidifier 14. When the air 8 passes through the dehumidifier 14, some of the moisture in the air 8 is removed and the dry air 8 at a low humidity is led to the first fan 13. Some of the air 8 passing through the first fan 13 is introduced into the bypass pipe 21 and the remaining air 8 is introduced into the housing 2 through the air supply duct 11.

The latter air 8 flows into the housing 2 from the branched portions 11a of the air supply duct 11. The air 8 spirally flows toward the central portion of the housing 2 along the inner wall of the housing 2. The air 8 contacts the water 5 flowing down along the filler 9 while flowing as described above. Because of the contact of the water 5 with the air 8, the heat of the water 5 is released (that is, heat exchange is performed), the temperature of the water 5 is lowered to 20° C. to 40° C. and the temperature of the air 8 rises. In this case, because the air 8 spirally flows, the staying time of the air 8 in the housing 2 and resultingly, the contact time between the air 8 and the water 5, are increased compared to the case in which the air 8 linearly flows in the radius direction. Moreover, in this case, because the air flows without deviating in the housing 2, the water 5 uniformly contacts the air 8. While the air 8 stays in the housing 2, latent heat is efficiently taken from the entire water 5 flowing in the housing 2. More heat is released, the water 5 easily evaporates, and resultingly the water 5 is efficiently cooled.

Moreover, the dry air 8 passing through the dehumidifier 14 contacts the water 5. In this case, if the dehumidifier 14 is not used, the vaporized amount of water to (released amount of heat) is influenced by the temperature change of the outside air and the temperature of water fluctuates. In general, the temperature of water does not easily lower as the temperature of outside air rises. Thus, the water cooling efficiency fluctuates depending on the weather condition. In the case of this embodiment, however, the humidity of the air 8 passing through the dehumidifier 14 is kept at an almost-constant stable small value without being influenced by the humidity of outside air. Therefore, it is possible to evaporate a large stable amount of moisture and continuously and stably obtain the water 5 with an almost-constant low temperature. A lot of heat of the water 5 is released compared to the case in which high-temperature air contacts high-temperature water. This also contributes to improvement of the cooling efficiency of the water 5.

In this case, the top end 2a of the housing 2 is closed differently from the case of the prior art. The air intake port 54 of the prior art is not opened on the outer periphery of the housing 2. Though the housing 2 is connected to the air supply duct 11 and exhaust duct 16, it is practically closed. Moreover, the whole of the housing 2 is covered with the cover 22. Because incoming of sunlight into the housing 2 is completely interrupted, the inside of the housing 2 is brought under a state about the same as a dark room. Therefore, though the temperature of the cooled water 5 is kept at 30° C. to 40° C. which is suitable for growth of algae, it is possible to prevent algae, moss, and mold requiring sunlight from growing and fungi from breeding. Because not only the inside of the housing 2 but also other portions are not contaminated due to growth of algae, it is possible to keep the cooling tower 1 clean. Because algae do not grow, it is unnecessary to decompose and remove them with chemicals and thereby, a trouble does not occur that the drain pipe 7 is clogged with decomposed substances. As a result, it is possible to set the cooling tower 1 of this embodiment not only outdoors but also indoors.

The water 5 whose temperature is lowered due to the above heat exchange is temporarily stored in the water tank 6. Then, the water 5 passes through the drain pipe 7 and it is discharged to the outside of the cooling tower 1. The water 5 is cooled in accordance with a series of operations described above.

The air 8 whose temperature and humidity are raised, is raised by the attraction due to the rotation of the second fan 18 and it flows into the exhaust duct 16. The air 8 passes through the first sterilizer 19 while flowing through the exhaust duct 16. Therefore, even if fungi such as bacteria breed in the housing 2 whose temperature and humidity are raised and the fungi enter the exhaust duct 16 together with the air 8, they are sterilized through irradiation with ultraviolet radiation in the first sterilizer 19.

The clean air 8 hardly containing fungi such as bacteria mixes with the dry air 8 flowing through the bypass pipe 21. Because of the mixture, the air 8 whose temperature and humidity are lowered is released from the exhaust duct 16. Therefore, if high-temperature high-humidity air is directly exhausted into the atmosphere in the winter when the temperature of outside air is low, some of the moisture in the air is condensed and transformed into fog because of mixing with outside air. Thus, a phenomenon generally referred to as white fume occurs. However, this embodiment lowers the humidity of the wet air 8 passing through the housing 2 before the air 8 is exhausted from the exhaust duct 16 by bypassing some of the dry air 8 in the air supply duct 11 to the exhaust duct 16. Therefore, even if the air 8 sent from the exhaust duct 11 mixes with outside air, the mount of moisture to be condensed decreases. Therefore, it is possible to control the production of white fumes even in a season such as winter in which white fumes are easily produced.

The first embodiment has the following features in addition to the matters above mentioned.

(a) If the air intake port (54) described in the "Prior Art" is formed in the housing 2, dust and dirt enters the housing 2 through the air intake port (54) together with outside air and it may accumulate in the water tank 6. The accumulated dust and dirt contaminate the water tank 6 and the water 5. In the case of this embodiment, however, even if dust and dirt enter the air supply duct 11, they are captured by the filter 15. Therefore, it is possible to prevent dust and the like from entering the housing 2 and the water tank 6 and the water 5 from being contaminated. Moreover, it is possible to remove the filter 15 from the air supply duct 11. Therefore, if the filter 15 is clogged with dust or the like, it is possible to clean the filter 15 by removing it or replace the filter 15 with a new filter 15 (not clogged with something). It is possible to remove dust and dirt from the air supply duct 11 only by performing a simple operation.

(b) When the cooling tower 1 of this embodiment is operated, working noises of the electric motors 12 and 17 are produced. However, the working noises are absorbed by the noise absorbing material 23 and interrupted by the cover 22. Moreover, noises are produced in the air supply duct 11 or exhaust duct 16 when the air 8 flows or noises are produced when the water 5 is dripped from the water spray pipe 4 or the filler 9 flow downward. However, these noises are also interrupted because the housing 2 is a closed vessel and moreover, it is covered with the cover 22. Therefore, the cooling tower of this embodiment is superior in the silence property because the above various noises are not easily transmitted up to the outside of the cover 22.

(c) From the viewpoint of introducing the dry air 8 into the exhaust duct 16 in order to prevent white fumes, it is also possible to connect the exit 21a of the bypass pipe 21 to the upstream side of the first sterilizer 19. However, the air 8 passing through the dehumidifier 14 and then entering the bypass pipe 21 does not contain fungi because the air 8 does not pass through the housing 2. Therefore, it is unnecessary to sterilize the above air 8. Otherwise, the amount of air 8 passing through the first sterilizer 19 increases and the workload of the first sterilizer 19 increases. This embodiment makes it possible to control the production of white fumes without increasing the workload of the first sterilizer 19 because the exit 21a of the bypass pipe 21 is connected to a position at the downstream side of the first sterilizer 19.

(d) If a unit or equipment using cooled water is set indoors and a cooling tower is set outdoors such as on the roof, the length of a water circulation channel (pipe) connecting the unit or the like with the cooling tower is increased. In the case of this embodiment, the cooling tower 1 can be set indoors as described above. Therefore, by setting the cooling tower 1 nearby a unit or equipment using cooled water, it is possible to greatly shorten the circulation channel (pipe) of the water 5. Moreover, it is possible to easily monitor the cooling tower 1.

(e) A factory requiring a large amount of cooled water must secure a large amount of air. In this case, if a structure for drawing air by one fan (53) is used like the case of the prior art, a large space is necessary for the inside of a cooling tower and resultingly, the size of the cooling tower increases. However, this embodiment makes it possible to secure a large amount of air 8 because the fans 13 and 18 are respectively set to the air supply duct 11 and exhaust duct 16 and the air 8 is forcibly supplied into the housing 2. Therefore, the cooling tower 1 can be downsized and the setting space is also decreased.

(f) In the case of the prior art, the air intake port 54 is formed on the outer periphery of the housing 51. Therefore, the water 57 dripped from the filler 55 and rebounded may be scattered to the outside of the housing 51. Therefore, the recovery rate of the water 57 decreases by a value equivalent to the scattered amount of water. In the case of this embodiment, however, the water 5 is scattered to the outside of the housing 2 because no air intake port is formed on the housing 2. Even if the water 5 is scattered toward the air supply duct 11, it is returned into the housing 2. Therefore, it is possible to minimize the loss of the water 5 due to scattering and improve the recovery rate.

Second embodiment

Figure 3:
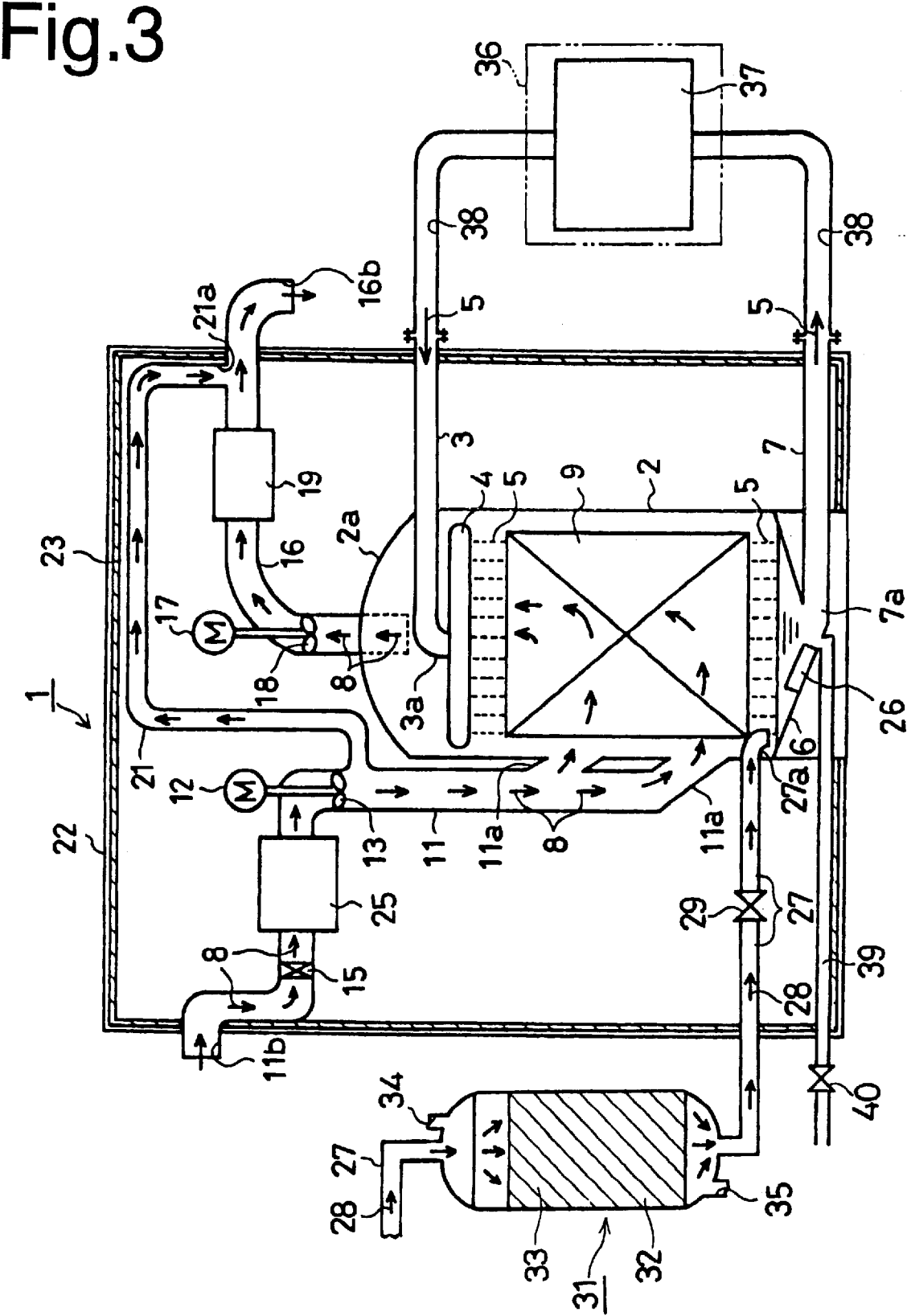
FIG. 3 is a schematic block diagram showing the cooling tower of the second embodiment of the present invention.
Figure 4:
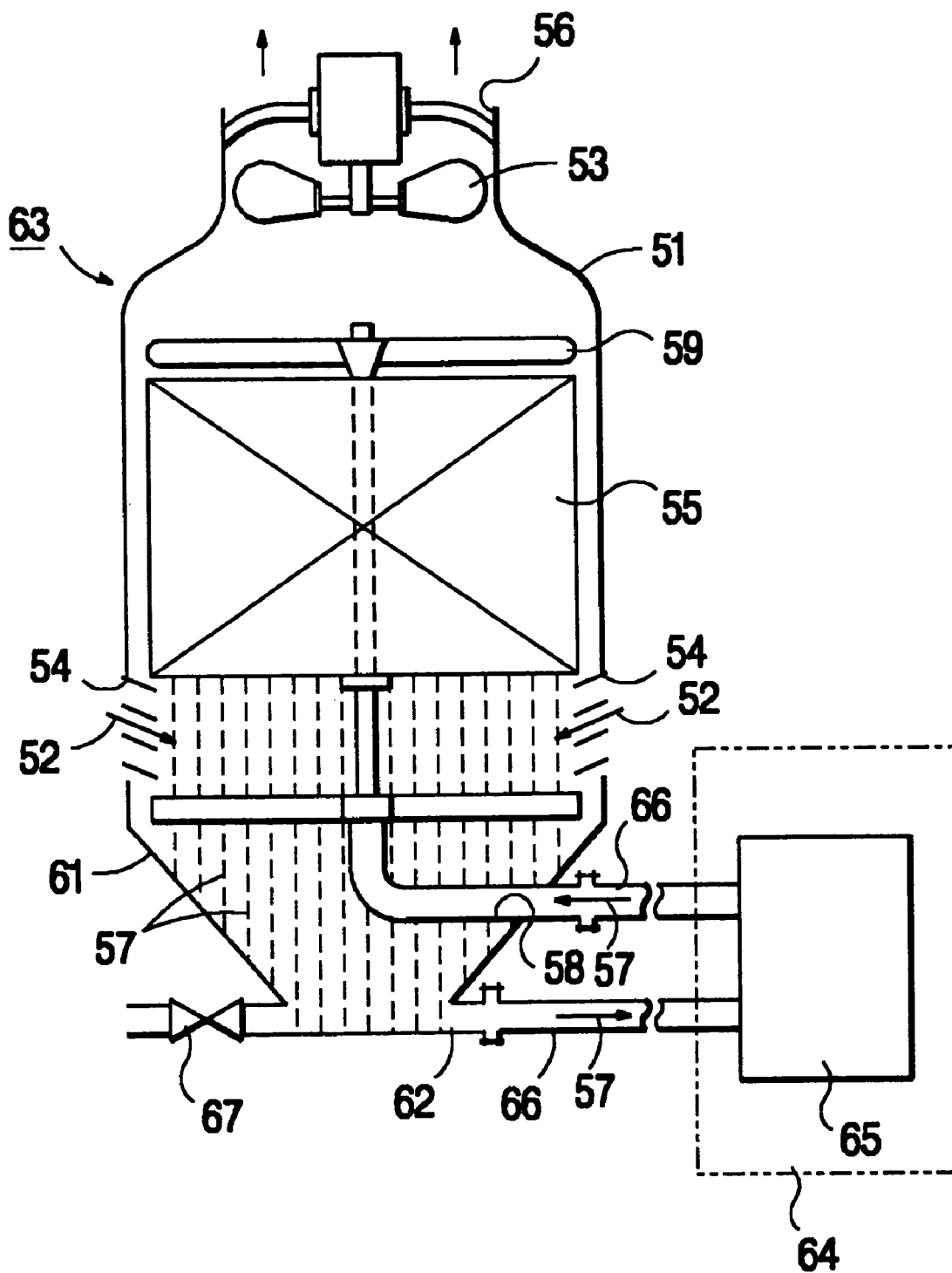
FIG. 4 is a schematic block diagram showing a conventional cooling tower.

The second embodiment is described below by referring to FIG. 3. Main differences from the first embodiment are that a cooler 25 is used as an air treatment apparatus instead of the dehumidifier 14, a second sterilizer 26 is positioned in the water tank 6, a make-up water introduction pipe 27 and a water softener 31 are added, and a molybdenum-based anticorrosive is added to the water 5 flowing through a circulation channel. In FIG. 3, a member same as that of the first embodiment is provided with the same number and symbol and its description is omitted.

It is already described that the water supply pipe 3 and the drain pipe 7 constitute a part of the circulation channel of the water 5. Another part of the circulation channel comprises a pipe 38. Further, the pipe 38 is connected to the water supply pipe 3 and the drain pipe 7, respectively. Moreover, a condenser 37 of a refrigerator 36 is positioned between the pipes 38. These pipes 38 and the condenser 37 are made of metals such as carbon steel, stainless steel, pure copper, and copper alloy.

The cooler 25 is an apparatus for taking heat from the air 8 in order to lower the temperature of the air 8 and uses a type provided with an air cooling coil. The air cooling coil includes a direct-expansion-type coil for evaporating a refrigerant by passing a refrigerant liquid through a coil and a cold-water-type coil for allowing cold water to pass. The cooler 25 is set between the filter 15 and the first fan 13 in the air supply duct 11. Moreover, the second sterilizer 26 is positioned in the bottom of the water tank 6 in which the water 5 supplied from the filler 9 is stored. The second sterilizer 26 can use a type performing sterilization through irradiation with ultraviolet radiation similarly to the case of the above-described first sterilizer 19.

The make-up water introduction pipe 27 is used to introduce make-up water 28 such as industrial water, well water, and city water into the housing 2 and its internal space constitutes a make-up water channel. The make-up water introduction pipe 27 penetrates the cover 22, sound absorbing material 23, and housing 2, and its end 27a opens at the top of the water tank 6. A selector valve 29 for opening or closing the make-up water introduction pipe 27 is positioned in the middle of the pipe 27. Moreover, the water softener 31 is positioned in the middle of the make-up water introduction pipe 27. It is possible to position the water softener 31 to the outside or inside of the cover 22 in the make-up water introduction pipe 27. The water softener 31 is provided with a case 32 and a cation exchange resin 33 within the case 32. The cation exchange resin 33 can use, for example, a sodium-type cation resin. The case 32 is provided with a regenerant injection port 34 for injecting a sodium-chloride solution serving as a regenerant and a regenerant ejection port 35 for ejecting the solution.

Moreover, a drain pipe 39 is connected to the bottom of the water tank 61. The drain pipe 39 penetrates the sound absorbing material 23 and cover 22 and extends up to the outside of the cover 22. The drain pipe 39 is provided with a drain valve 40 for opening or closing the pipe 39.

The second embodiment having the above structure has the same functions and advantages as the first embodiment. Moreover, in the case of the second embodiment, the cooler 25, second sterilizer 26, make-up water introduction pipe 27, water softener 31, and anticorrosive have the functions and advantages shown in the following Items (i) to (iv).

(i) The cooler 25 cools the air 8 flowing through the air supply duct 11. The water vapor in the air 8 is saturated while the air 8 is cooled. Moreover, when cooling is further performed and the air 8 is at the dew-point temperature or lower, the water vapor starts condensing. Thus, moisture is separated from the air 8 and thereby, the temperature of the air 8 is lowered. The air 8 whose temperature and humidity are lowered is introduced into the housing 2 through the air supply duct 11 or into the exhaust duct 16 through the bypass pipe 21. The air 8 introduced into the housing 2 contacts the high-temperature water 5. As soon as the air 8 contacts the water 5, the temperature of the air 8 rises. In the case of the humidity of the air 8, the wait until the air is saturated is increased and thereby, more moisture is taken into the air 8. That is, it is possible to take more latent heat of vaporization from the water 5 and improve the cooling efficiency of the water 5.

Moreover, the air 8 introduced into the exhaust duct 16 through the bypass pipe 21 mixes with the air passing through the first sterilizer 19. Because of this mixture, the air 8 having a low temperature and a low humidity is exhausted from the exhaust duct 16. Also in this case, it is possible to control the production of white fumes in a season such as winter in which white fumes are easily produced.

Furthermore, the water 5 in the housing 2 functions as a heating means. Therefore, when a cooling dehumidifier is used as the dehumidifier 14, it is necessary to use the heating means for returning the air whose temperature is lowered due to cooling to the temperature before cooled. However, this embodiment does not require the heating means. Thereby, the structure of an air treatment apparatus can be further simplified. This is advantageous to reduce the cost of the air treatment apparatus and resultingly, to reduce the entire cost of the cooling tower 1.

(ii) The second sterilizer 26 irradiates the water 5 collected in the water tank 6 through the filler 9 with ultraviolet radiation. This irradiation sterilizes the fungi such as bacteria in the water 5. Therefore, it is possible to prevent fungi from breeding in the water tank 6. It is possible to further prevent fungi from being ejected from the exhaust duct 16 in accordance with the synergistic effect of the sterilization by the second sterilizer 26 and the sterilization by the above-described first sterilizer 19.

(iii) Because the temperature of the water 5 is lowered by evaporating the water 5 and thereby taking the latent heat in the cooling tower 1, the water 5 can be condensed due to the evaporation. In this case, when the water 5 contains hard components such as calcium and magnesium ions, the content of the hard components is raised by the above condensation. Moreover, in a saturated state, the hard components are precipitated and attached to the metallic surfaces (contact surfaces with water) of the pipe 38 and condenser 37 as scales. The above scales contain such components as calcium carbonate ($CaCO_3$), calcium phosphate ($CaPO_4$), silica ($SiO_2$), magnesium silicate ($MgSiO_3$), calcium sulfate ($CaSO_4$), and magnesium sulfate ($MgSO_4$). Because these components have heat conductivities lower than those of metals, they cause the heat exchange rate of the condenser 37 to be reduced.

However, this embodiment is further provided with the make-up water introduction pipe 27 and water softener 31. Therefore, when opening the selector valve 29, the make-up water 28 flows through the make-up water introduction pipe 27 and the water softener 31 and it is introduced into the water tank 6. In the case of the water softener 31, when the make-up water 28 passes through the cation exchange resin 33, the hard components in the make-up water 28 are adsorbed by the exchange resin 33 and exchanged to ions (sodium ions) contained in the resin. That is, the make-up water 28 is changed to soft water. Therefore, the make-up water 28, free from hard components or containing only a small amount of hard components, is introduced into the water tank 6. Thus, the amount of the water 5 circulating through the circulation channel is slowly decreased due to evaporation. However, the decrease of the water 5 is replenished by the softened make-up water 28. Moreover, attachment of scales (in this case, calcium carbonate, calcium phosphate, magnesium silicate, calcium sulfate, and magnesium sulfate) to the pipe 38 and condenser 37 is controlled and the deterioration of the heat exchange efficiency due to the attachment is prevented.

Moreover, according to this embodiment, the measure having been taken for prevention of attachment of scales, that is, the amount of the water 5 to be forcibly discharged (blow down) from the water tank 5 by opening the drain valve 40, is decreased and the loads applied to maintainers and managers of the cooling tower are decreased. Furthermore, because the housing 2 is practically closed and moreover, the filter 15 is set to the middle of the air supply duct 11, it is prevented that dust and foreign matter in the outside air enter the housing 2 and mix with the water 5. Therefore, differently from the conventional cooling tower 63 which is set to an outdoor well-ventilated place and thereby, outside air 52 is directly introduced into the housing 2 from the air intake port 54, it is prevented that the water 5 softened by the water softener 31 is contaminated due to dust and foreign matter and the content of the hard components in the water 5 rises.

Though hard components are adsorbed to the cation exchange resin 33 as described above, it is possible to remove the hard components from the resin 33 by regularly cleaning the resin 33 with a regenerant. According to this cleaning, it is possible to recycle the cation exchange resin 33 many times.

(iv) In the water 5, ions which cannot be removed by the water softener 31 such as silica ions, chlorine ions, sulphate ions may remain as harmful components. In the case of this embodiment, however, a molybdenum-based anticorrosive is added to the water 5. The molybdenum anticorrosive can use, for example, $Na_2MoO_4 \cdot (2H_2O)$ or $ZnCl_2MoO_4$.

When the condenser 37 and pipe 38 are made of metals containing iron, by adding a molybdenum-based anticorrosive to the water 5, molybdic acid ions in the water 5 react on ferrous iron ions ($Fe^{2+}$) on the metallic surfaces of the condenser 37 and pipe 38 to produce ferrous iron molybdate ($FeMoO_4$). The ferrous iron molybdate is oxidized by oxygen dissolved in the water 5 to become ferric iron molybdate ($MoO_4)_3$. Thus, a protective film made of the oxide of molybdenum and iron is formed on the metallic surfaces. The protective film is stronger and more dense than a conventional protective film made of orthophosphate, polymeric orthophosphate, and phosphonate and shows a corrosion resistance higher than that of the conventional protective film. In other words, the former protective film controls dissolution at the anode portion on a metallic surface. Therefore, even if ions which cannot be removed by the water softener 31 remain in the water as harmful components, the reaction between these ions and a metallic surface is interrupted by the protective film. Moreover, the following original features of a molybdenum-based anticorrosive are shown also for this embodiment: (I) the chemicals are stable for a long time, (II) the pH region of applicable water is wide, and (III) phosphorus is not contained.

In the case of the above embodiments, it is assumed that diagonal connection of the air supply duct 11 to the housing 2 is (a), setting of the dehumidifier 14 or cooler 25 to the air supply duct 11 is (b), setting of the first sterilizer 19 to the exhaust duct 16 is (c), setting of the second sterilizer 26 in the water tank 6 is (d), communication of a position at the downstream side of the dehumidifier 14 or cooler 25 of the air supply duct 11 with the exhaust dust 16 by the bypass pipe 21 is (e), addition of the make-up water introduction pipe 27 and the water softer 31 is (f), and addition of a molybdenum-based anticorrosive to the water 5 is (g). Items (a), (b), (c), and (d) are applied to the cooling tower 1 in the case of the first embodiment and Items (a) to (g) are applied to the cooling tower 1 in the case of the second embodiment. However, it is also possible to omit some of the Items (a) to (g). Specifically, it is possible to omit any one of the Items (a) to (g) or omit two or more Items by combining them.

Moreover, by adjusting the temperature and flow rate of the air 8 flowing into the housing 2 or the humidity of the air 8 after heat-exchanged, it is possible to control the temperature of the water 5 to an optional value. By controlling operations of the electric motors 12 and 17, dehumidifier 14, and cooler 25 with a computer, it is possible to automate the temperature adjustment of the water 5.

Furthermore, a cooling tower of the present invention can be not only applied to the above-described condenser but also applied to a case of cooling the cooled water used for an evaporator, cooler, and radiator of a refrigerator or the cooled water used for a driving section of a machine. Furthermore, it is possible to embody the present invention for a cooling tower storing an evaporation-type condenser.

Advantages of the Invention

As described above, the invention makes it possible to prevent algae, moss, and mold from growing or fungi from breeding and keep a housing clean. Thereby, it is possible to set a cooling tower indoors.

The invention also makes it possible to efficiently cool water by increasing the contact time of air with the water in a housing, in addition to the advantage of the first invention.

The invention furthermore makes it possible to efficiently cool water by bringing dry air into contact with the water.

Moreover, the invention makes it possible to decrease the fluctuation in temperature of water after cooled independently of the humidity of outside air.

The invention makes it possible to prevent fungi such as bacteria from being ejected through an exhaust duct, in addition to the advantage of any one of the first to third inventions.

The invention also makes it possible to control breeding of fungi such as bacteria and moreover, prevent the fungi from being ejected from a housing, in addition to the advantage of any one of the first to fourth inventions. Particularly, it is possible to greatly decrease the number of fungi to be ejected to the outside of an exhaust duct in accordance with the synergistic effect of the both apparatuses.

The invention makes it possible to control the production of white fumes even in a season such as winter in which white fumes are easily produced.

The invention also makes it possible to keep the amount of water flowing through a circulation channel almost constant by supplying make-up water. Moreover, the invention makes it possible to prevent scales from attaching to, for example, a condenser and pipe of a refrigerator and moreover prevent the heat exchange efficiency from lowering due to the attachment of the scales.

The invention makes it possible to prevent corrosion and scale attachment due to ions which cannot be removed by a water softener and which remain in water as harmful components by a protective film made of the oxide of molybdenum and a metal.

What is claimed is:

1. A cooling tower, comprising:
   a cover;
   a heat exchanger positioned within a water circulation channel to exchange heat between water and air through contact with air;
   a closed housing positioned within said cover and within which said heat exchanger is positioned and maintained in an airtight state and interrupting irradiation of said heat exchanger by light;
   an air flow duct in flow communication with said housing for supplying air to said housing and an exhaust duct in flow communication with said housing for exhausting air from said housing and for interrupting irradiation of said heat exchanger by light; and
   blowing means for generating air flow in said air supply duct, housing, and exhaust duct.

2. The cooling tower according to claim 1, wherein said housing is generally cylindrical and said air supply duct is diagonally connected to the outer periphery of said housing so as to extend in the almost tangential direction of the outer periphery.

3. The cooling tower according to claim 1, wherein an air treatment apparatus having either a dehumidifying function or a cooling function is positioned within said air supply duct.

4. The cooling tower according to claim 1, wherein a first sterilizer is positioned within said air supply duct.

5. The cooling tower according to claim 4, wherein a first water tank is positioned at the bottom of said housing in order to collect water from said heat exchanger and a second sterilizer is positioned within the water tank.

6. The cooling tower according to claim 3, wherein a position at the downstream side of the air treatment apparatus of said air supply duct is communicated with said exhaust duct by a bypass pipe.

7. The cooling tower according to claim 1, further comprising a make-up water channel for introducing make-up water into said housing and a water softener positioned within the middle of said make-up water channel.

8. The cooling tower according to claim 7, wherein a molybdenum-based anticorrosive is added to the water flowing through said circulation channel.

9. A cooling tower, comprising:
   a heat exchanger positioned within a water circulation channel to exchange heat between water and air through contact with air;
   a closed substantially cylindrical housing within which said heat exchanger is positioned and maintained in an airtight state and interrupting irradiation of said heat exchanger by light;
   an air supply duct in flow communication with said housing for supplying air to said housing and an exhaust duct in flow communication with said housing for exhausting air from said housing and for interrupting irradiation of said heat exchanger by light, said air supply duct includes a plurality of inlets disposed peripherally about said housing and extending tangentially thereto; and
   blowing means for generating air flow in said air supply duct, housing, and exhaust duct.

10. The cooling tower of claim 9, wherein an air treatment apparatus having either of a dehumidifying function or a cooling function is positioned within said air supply duct.

11. The cooling tower of claim 9, wherein a first sterilizer is positioned within said air supply duct.

12. The cooling tower of claim 11, wherein a water tank is positioned at the bottom of said housing in order to collect water from said heat exchanger, and a second sterilizer is positioned within the water tank.

13. The cooling tower of claim 10, wherein a position at the downstream side of the air treatment apparatus of said air supply duct is communicated with said exhaust duct by a bypass pipe.

\* \* \* \* \*